350-96.25 SR
XR 3,699,312
SEARCH ROOM
SUBSTITUTE FOR MISSING XR

United Sta
Jones et al.

[15] 3,699,312
[45] Oct. 17, 1972

[54] CODE SCANNING SYSTEM

[72] Inventors: John E. Jones; Paul V. McEnroe, both of Raleigh, N.C.

[73] Assignee: International Business Machines Corporation, Armonk, N.Y.

[22] Filed: March 18, 1971

[21] Appl. No.: 125,653

[52] U.S. Cl. ........................235/61.11 E, 250/219 D
[51] Int. Cl. ..............................................G06k 7/14
[58] Field of Search.................235/61.11 E; 250/219

[56] References Cited

UNITED STATES PATENTS 3,217,294 11/1965 Gerlach...............235/61.11 E
3,270,132 8/1966 Richey...............235/61.11 E

*Primary Examiner*—Daryl W. Cook
*Assistant Examiner*—Robert F. Gnuse
*Attorney*—Hanifin & Jancin and John B. Frisone

[57] ABSTRACT

A scanning system for reading coded indicia on merchandise for providing input data to an automated retail sales station in which the scanning mechanism is hand held in fixed relationship to the item bearing the indicia by a salesclerk or operator who is provided with an indication of a successful transfer of the data.

10 Claims, 9 Drawing Figures

INVENTORS
JOHN E. JONES
PAUL V. MC ENROE

BY John B. Iriborne
ATTORNEY

FIG. 8

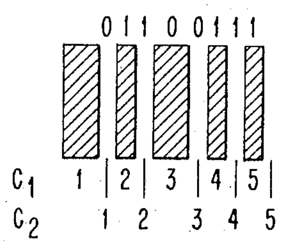

| | $C_1/C'_1$ COUNTER | $C_2/C'_2$ COUNTER | OUTPUT REGISTER |
|---|---|---|---|
| $t_{1-1}$ | ZERO | ZERO | $\overline{\text{SHIFT}}$ |
| $t_{1-1}$ DELAY | RESET/$C_{1-1}$ | ZERO | |
| $\bar{t}_{1-1}$ | $C_{1-1}$ | ZERO | $\overline{\text{SHIFT}}$ |
| $\bar{t}_{1-1}$ DELAY | $C_{1-1}$ | RESET/$C_{2-1}$ | |
| $t_{1-2}$ | $C_{1-1}$ | $C_{2-1}$ | SHIFT 0 |
| $t_{1-2}$ DELAY | RESET/$C_{1-2}$ | $C_{2-1}$ | |
| $\bar{t}_{1-2}$ | $C_{1-2}$ | $C_{2-1}$ | SHIFT 1 |
| $\bar{t}_{1-2}$ DELAY | $C_{1-2}$ | RESET/$C_{2-2}$ | |
| $t_{1-3}$ | $C_{1-2}$ | $C_{2-2}$ | SHIFT 1 |
| $t_{1-3}$ DELAY | RESET/$C_{1-3}$ | $C_{2-2}$ | |
| $\bar{t}_{1-3}$ | $C_{1-3}$ | $C_{2-2}$ | SHIFT 0 |
| $\bar{t}_{1-3}$ DELAY | $C_{1-3}$ | RESET/$C_{2-3}$ | |
| $t_{1-4}$ | $C_{1-3}$ | $C_{2-3}$ | SHIFT 0 |
| $t_{1-4}$ DELAY | RESET/$C_{1-4}$ | $C_{2-3}$ | |
| $\bar{t}_{1-4}$ | $C_{1-4}$ | $C_{2-3}$ | SHIFT 1 |
| $\bar{t}_{1-4}$ DELAY | $C_{1-4}$ | RESET/$C_{2-4}$ | |
| $t_{1-5}$ | $C_{1-4}$ | $C_{2-4}$ | SHIFT 1 |
| $t_{1-5}$ DELAY | RESET/$C_{1-5}$ | $C_{2-4}$ | |
| $\bar{t}_{1-5}$ | $C_{1-5}$ | $C_{2-4}$ | SHIFT 1 |
| $\bar{t}_{1-5}$ DELAY | $C_{1-5}$ | RESET/- | |

COUNT = 10 = READ

CODE SCANNING SYSTEM

BACKGROUND OF THE INVENTION

The invention relates to a scanning system in general and more particularly to a scanning system suitable for scanning coded indicia or items for providing input data to an automated retail sales post or the like.

DESCRIPTION OF THE PRIOR ART

Automated checkout stands and sales posts have become increasingly attractive as the availability of computers for handling this increases. However, a major problem is presented in entering the data into the system. Various schemes have been proposed for placing identifier codes on merchandise and automatically reading these codes in a data processing system.

Ideally, the products would be coded by the manufacturers at the time of manufacture with a unique code identifying the item. At the sales post or checkout counter, the items would be placed on a conveyer or similar device which would carry them past a reading station where the code on each item would be automatically read and transmitted to the data processing system which would prepare a sales slip including a description of the items purchased, quantity of each item purchased, subtotals, sales tax and total. The data gleaned from the merchandise, in conjunction with information supplied to the salesclerk, could be used for inventory control, reordering and billing.

Automated reading of coded indicia is, as a practical matter, precluded since the indicia bearing items come in a wide variety of shapes and sizes. These shape and size differences present severe problems in orientation and detection which, while not technically insurmountable, are nevertheless economically limiting.

Operator controlled hand-propelled scanning devices for detecting and signalling the item identification code have been proposed for providing the necessary inputs at a cost which is not prohibitive. However, hand-propelled scanning devices for reading the item identification code have not proven entirely satisfactory. One of the major problems is speed or throughput. In order to secure an accurate reading, the scanning device when propelled must be in registration with the code; otherwise, the data read is erroneous. With many packages, maintaining registration between the hand-propelled scanner and the item identification code on the package is at best difficult and thus limits speed or throughput if error free reading is desired.

Removable item identification tags affixed to the merchandise at the time of manufacture or subsequently, provide a partial solution. At the point of sale, the tags are removed and inserted in tag readers where the data is detected. This solution again limits throughput and is therefore unacceptable in environments such as presented in supermarkets and similar high volume sales posts.

SUMMARY OF THE INVENTION

The invention contemplates a scanning system for reading a selectively reflective coded indicia placed on merchandise packages and the like. The system includes a scanning head which is adapted to be placed in a fixed relationship with respect to the coded indicia on the package which is to be read. The scanning head includes a light source for illuminating the indicia, first light conductive means for transmitting light reflected from the indicia to a first termination and for presenting said light at said first termination in the same orientation as received from the selectively reflected coded indicia, a second light conductive means for transmitting the light from the first termination to a second termination and causing the orientation of the transmitted light to undergo a rotational displacement of approximately 90°, cyclically operable means for aperture scanning the image of the indicia presented at the first termination successively at different positions with respect to the termination, all of said successive different positions having the same orientation, and thereafter aperture scanning the image of the indicia presented at the second termination successively at different positions on the second termination with an orientation rotationally displaced approximately 90° with respect to the image presented at the first termination, and transducer means responsive to the aperture scanned image for providing electrical signals corresponding to the intensity of the transmitted light. Means responsive to the output from the transducer means for storing the information supplied and additional means responsive to the cyclically operated scanning means for counting events occurring in the signals generated by the transducer means for indicating a complete scan whenever the counted events equal a predetermined number and thereafter signalling the attainment of said predetermined events to the operator.

One object of the invention is to provide a scanning system for reading coded indicia placed on merchandise packages and the like which is easily used by an operator and does not restrict speed or throughput of data from the operator to the central processing system.

A second object of the invention is to provide a scanning system as set forth above which is substantially error free in operation.

A further object of the invention is to provide a scanning system as set forth above which is held in fixed position by an operator while the scanning operation is completed.

Yet another object of the invention is to provide a scanning system as set forth above which is insensitive to orientation or alignment with respect to the indicia to be scanned.

The foregoing and other objects, features and advantages of the invention will be apparent from the following more particular description of a preferred embodiment as illustrated in the accompanying drawings.

BRIEF DESCRIPTION OF THE DRAWINGS

FIG. 8 is a table illustrating the storage contents of circuit components utilized in the invention.

DESCRIPTION OF THE PREFERRED EMBODIMENT

Figure 1:
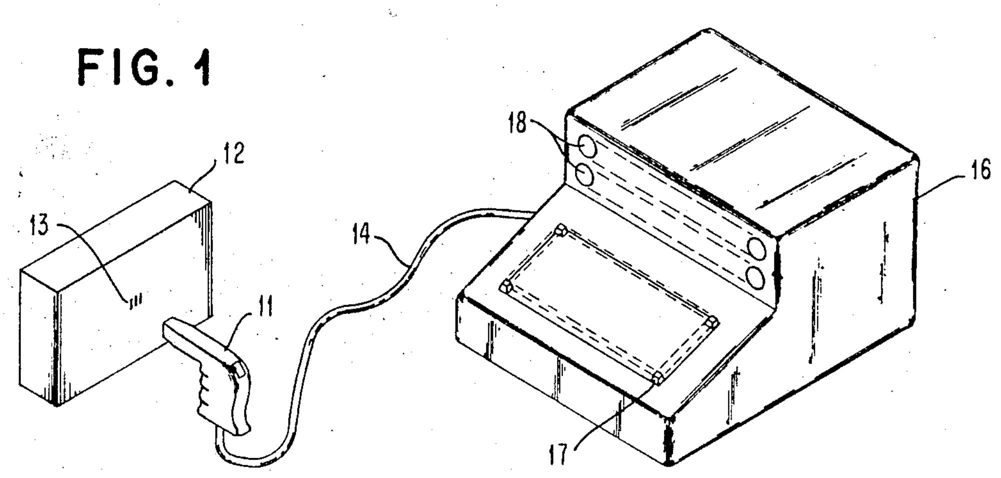
FIG. 1 is a perspective view of the novel scanning system in an operational environment.

In FIG. 1, the scanning head 11 is shown in proximity to a container 12 which has printed thereon indicia 13. The indicia 13 is printed on the container 12 or the wrapper for container 12 if the container is wrapped and includes alternating areas of reflective and nonreflective material. For example, the nonreflective material may include black marks printed on a light or white, light reflecting background. In operation, the scanning head will be placed in contact with the container 12 in the area of the printed indicia 13 so as to completely cover the indicia 13. Signals generated in the scanning head 11 are conducted via a cable 14 to a terminal and control unit 16. Terminal and control unit 16 may include a keyboard 17 via which an operator may enter data and a visual display 18 wherein data entered by the operator will be displayed.

Figure 2:
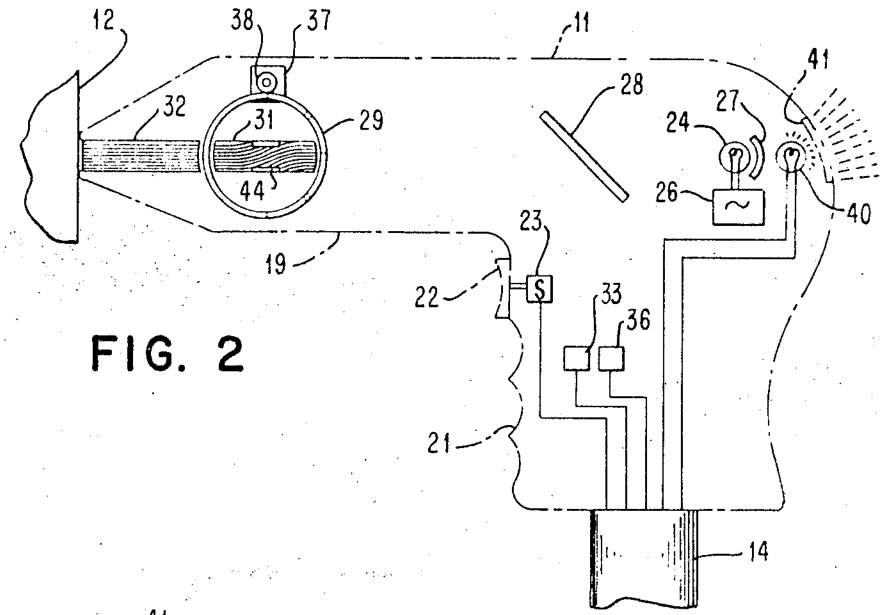
FIG. 2 is a schematic illustration of the scanning head shown in FIG. 1.

The scanning head shown schematically in FIG. 2 is pistol shaped and includes a barrel portion 19 and a grip portion 21. The grip portion 21 includes a trigger-like switch actuator 22 which operates a switch 23. Conductors from switch 23 go back through cable 14 to terminal and control unit 16. The function of switch 23 will be described later in connection with the description of the FIG. 9. A light 24 is connected to a power source 26. The power source 26 may either be local or may be remotely located and is only shown schematically to illustrate the invention. A spherical mirror 27 located behind the light 24 reflects the light radiated from the back side of the lamp 24. The light from source 24 and mirror 27 passes through a half-silvered mirror 28 and is directed toward a drum-like member 29. The drum-like member 29 is provided with several openings or translucent areas and will be described in greater detail in connection with the description of FIG. 3. The illumination passing through the openings in the drum 29 passes through a fiberoptic bundle 31. The fiberoptic bundle 31 is provided with a 90° twist so that the orientation of an image at the two ends of the bundle is rotated by 90°, thus an upright image to the left side of the bundle will result from a horizontal image at the right side of the bundle. This twisting effect is illustrated in the drawing by the lines representing the fibers within the bundle. The light passing through the fiberoptic bundle 31 passes again through the drum member 29 and via a second fiberoptic bundle 32 to the container 12. The fibers in bundle 32 are oriented in straight lines and do not cause any rotation whatsoever of the image; thus, a vertical image on the right results in a vertical image on the left. If the scanning head 11 is positioned over the printed indicia 13 on the container 12, the light passing through the path just described will be selectively reflected by the printed indicia and returned via the same path back to the half-silvered mirror 28. Some of the light at the half-silvered mirror 28 will be reflected downwardly to a photoreceiver 33 where the light energy will be converted into electrical signals which will be sent via cable 14 back to the terminal and control unit 16. The nature of these signals and what is done with them will be described later in conjunction with the other figures of the drawing. The outer surface of drum 29 is generally nonreflective; however, along one edge, discrete reflective areas 34 illustrated in FIG. 4 are provided. The reflective areas 34 reflect back some of the light from source 24. The reflected light is again reflected by half-silvered mirror 28 and received at a second photoreceiver 36. The electrical signals of photoreceiver 36 are sent back to the terminal and control unit 16 via cable 14. A motor schematically illustrated at 37 drives a drive wheel 38 which engages the outer periphery of drum 29 and causes drum 29 to rotate when the motor 37 is energized. Motor 37 and light source 24 are energized under control of switch 23 which is activated whenever the trigger mechanism 22 is depressed by the operator. The connections to lamp 24 and source 26 and to motor 37 have been eliminated in order to preserve clarity. These connections are obvious and would only obscure the drawing. The signal lamp 40 under control of the circuits in the terminal and control unit 16 are positioned immediately adjacent a colored window 41 and whenever a scan has been successfully completed, the control unit illuminates the lamp 40 which becomes visible through the colored window 41 to thus indicate to the operator that the printed indicia 13 on the container 12 has been successfully read.

Figure 3:
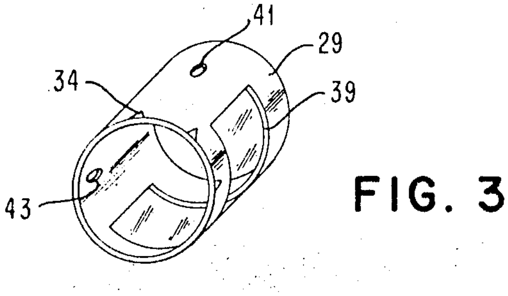
FIG. 3 is a perspective view of the scanning drum shown in FIG. 2.
Figure 4:
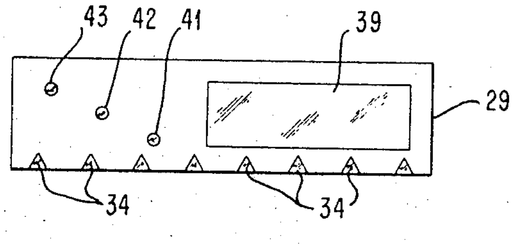
FIG. 4 is a plan view of the outer surface of the drum illustrated in FIG. 3.

The details of the drum 29 are illustrated in FIGS. 3 and 4. The drum may be made of a film of plastic material or alternatively it may be made of any other suitable rigid or semi-rigid material. The drum is generally cylindrical and has an opaque thin wall provided with the openings or transparencies illustrated in FIGS. 3 and 4. The drum is provided with four openings or transparencies 39, 41, 42 and 43. The opening or transparency 39 is rectangular in shape and extends over approximately 180° of the drum surface. The openings or transparencies 41, 42 and 43 are circular in nature and comprise scanning apertures. These are relatively small in diameter; however, they must be of sufficient diameter to admit or pass enough detectable light. The apertures 41, 42 and 43 are spaced approximately 45° apart, thus leaving a 45° guard band between the first aperture 41 and the termination of the transparency or opening 39 and another 45° between the other side of the opening or transparency 39 and the aperture 43. In addition, the apertures 41, 42 and 43 are spaced approximately 45° from each other. The apertures 41, 42 and 43 are within the axial extent of the aperture 39; however, they are axially displaced from each other and spaced along the axial direction within the bounds of the axial extent or transparency 39. The reflective marks 34 are spaced at approximately 45° separations about the circumference of the outer surface of the drum 39 and are positioned so as to be somewhat forward of the scanning apertures 41, 42 and 43 in the direction of rotation of the drum member 29. Thus, the light reflected from reflective marks 34 will occur just prior to the light passing through a scanning aperture.

As the drum 29 rotates in the position illustrated in FIG. 2, the apertures 41, 42 and 43 will in succession scan the image at the termination of the fiber bundle 32. If, for example, this is an upright image, an upright image will be scanned successively three times along three spaced parallel lines. The light transmitted by the apertures 41, 42 and 43 in succession will pass through the bundle 31 and exit via the aperture 39 to the half-silvered mirror 28. The successive scans will be reflected from the mirror 28 and presented to the photodetector receiver 33 where the light will be converted to electrical signals and transmitted back to the terminal control unit 16. Each of the scans referred to above is preceded by a signal transmitted via photoreceiver 36. This signal is generated by the light reflected by the reflected marks 34. As the aperture 41 rotates through 180°, the aperture 39 is now presented at the termination of fiber bundle 32 and the apertures 41 through 43 will commence to scan the image appearing at the termination of fiber bundle 31. This image as previously stated is rotated by 90°; thus, the upright image previously scanned will now be scanned again. However, the image will no longer be upright and will be rotated 90° into a horizontal position. Again, the horizontal or rotated image will be scanned three successive times and each of the scans will be along different parallel lines having the same orientation with the image. These scans likewise will be transmitted via the half-silvered mirror 28 to the photoreceiver 33 converted into electrical signals and returned via cable 14 to the terminal and control unit 16. The structure thus far described provides three successive spaced parallel scans of the image in one direction followed by three successive spaced parallel scans of the image at approximately 90° rotational orientation with respect to the first three scans. The fiber bundle 31 is rigidly supported with respect to the rotating drum 29 internally thereof by support members 44. The structural details of the mechanisms described have been omitted since they are straightforward and their inclusion would only obscure operation of the device.

Figure 5:
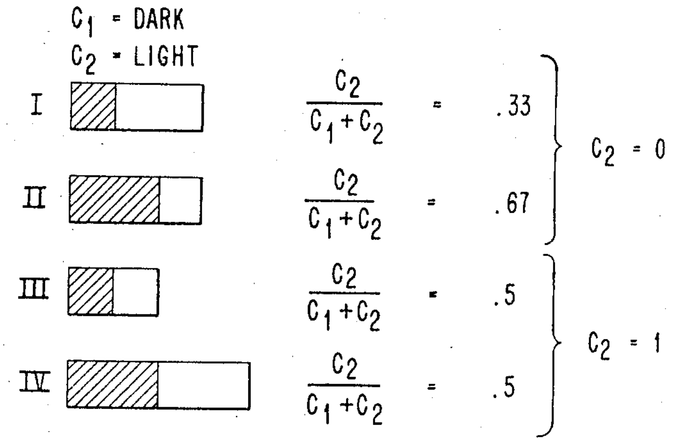
FIG. 5 is a graphical representation of a coding technique suitable for use with the invention.
Figure 6:
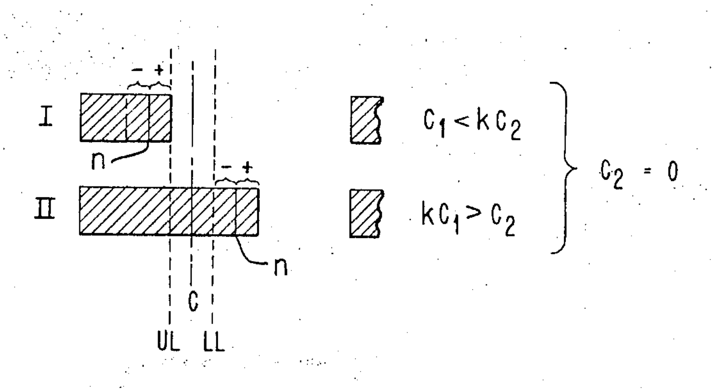
FIG. 6 is a graphical representation of the coding technique illustrated in FIG. 5.
Figure 7:
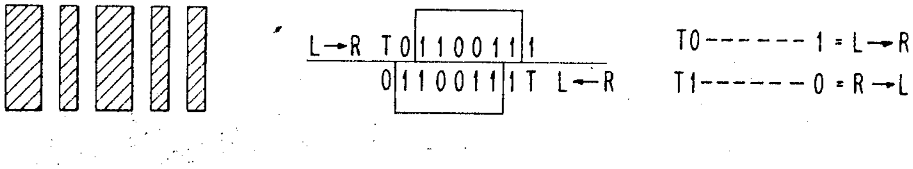
FIG. 7 is another graphical illustration of the coding technique illustrated in FIG. 5.

The code suitable for printing on the container 12 is illustrated in FIGS. 5, 6 and 7. This code is effected by arranging alternate dark and light areas which reflect and absorb incident light. In FIG. 5, four possible code combinations are illustrated. The first part of the combination includes a dark area referred to in the description as $C_1$ and a light area referred to as $C_2$. The dark area absorbs incident light and the light area reflects incident light. This particular code is commonly referred to as retrospective bar coding and does not require a timing signal. In the first illustration of FIG. 5, a short, dark area is followed by a long, light area, thus indicating a binary zero for the light area. Here the fraction $C_2/(C_1 + C_2) = 0.33$. The second illustration depicts a long, dark area followed by a short, light area. Both of these indicate a binary zero for the light area since the length of the light area differs from the preceding dark area in length.

The coding for a binary one bit is illustrated at III and IV in FIG. 5. Here the dark and light areas are equal and the equation $C_2/(C_1 + C_2) = 0.5$ defines this condition. In III, a short, dark area is followed by a short, light area and in IV, a long, dark area is followed by a long, light area. Obviously, whether a light area or a dark area is first makes no difference. Thus, the next step in the sequence disclosed would be to compare the length of the light area illustrated with a following dark area.

The conditions illustrated and defined in FIG. 5 are ideal conditions and cannot be achieved in a practical system. Thus, equality or alternatively greater or less than must be determined within certain limits. These limits are illustrated in FIG. 6. The error or imprecision is introduced primarily by the tolerances in printing the marks and spaces on the container with available state of the art commercial printers. Another major source of error comes from acceleration and deceleration of the scanner which again may be reduced to a very small value, however, at an increased cost. The third major source of error is the size of the scanning apertures 41, 42 and 43. These apertures must be sufficiently large to conduct or pass sufficient light to be detected. However, as the aperture size increases, the precision with which one may define a transistion from a dark to a light area or vice versa decreases.

In FIG. 6, the two conditions producing a zero binary indication are illustrated at I and II. I illustrates a condition where the $C_1$ area is smaller than the $C_2$ area and II illustrates the condition wherein a $C_1$ area is larger than the following $C_2$ area. The lower case letter n designates the normal or nominal position of the particular bars. The center or equal position is designated by the lower case letter *c*. If the area between the nominal position and the center position is divided approximately equally, then the length of the bars may vary by the amounts shown with the plus and minus signs. The equations illustrated to the right of I and II, that is $C_1 < kC_2$ and $kC_1 > C_2$, will indicate if satisfied that $C_2$ defines a binary zero state for the proportions illustrated and with an equal division of the area between the nominal positions and the center. The value of the constant *k* will be between approximately 0.66 and 0.70. The value, however, may be permitted to vary over a reasonably large range or some other division of the tolerances may be made. The marks *u*l and l l define the upper and lower limits of the short and long bars, respectively.

A typical printed indicia is reproduced on the left side of FIG. 7 and includes from left to right a first wide bar. This bar conveys no information and acts as a reference or marker. This bar is followed by a first narrow space which in conjunction with the preceding wide bar designates a zero binary level. The first narrow space is followed by a second narrow bar which in conjunction with the first narrow space designates a binary one level or state. The second narrow space in conjunction with the preceding second narrow bar designates a binary one level or state. The third wide bar in conjunction with the preceding second narrow space designates a binary zero state. The third narrow space in conjunction with the preceding third wide bar designates a zero binary state. The fourth narrow bar in conjunction with the preceding third narrow space designates a binary one level. The fourth narrow space in conjunction with the preceding narrow fourth bar designates a binary one level also, and finally the fifth narrow bar in conjunction with the preceding fourth narrow space designates a binary one level. In the center of FIG. 4, the tabulated values indicate the readings following the reference marker for either left to right or right to left readings. The first bit on reading from left to right is always zero and the last bit is always one irrespective of the indicia needed to identify the item. Thus, the reading format will be as indicated for both left to right and right to left at the extreme right side of FIG. 7. If the indicia is read from left to right, the bits will be "zero" followed by the indicia and ending in "one" and a right to left read will give "one" followed by the indicia and will terminate with a "zero." With this technique, it is possible to know whether the indicia has been scanned from left to right or from right to left by a successful scan as described above and the significance of the bits can thus be determined to properly identify the item.

The code illustrated in FIGS. 5, 6 and 7 is considered particularly effective in this application; however, the invention is applicable and usable with a wide variety of bar codes and should not be considered limited to the specific code disclosed herein since the principles of operation are not limited to any particular or specific codes.

Figure 9:
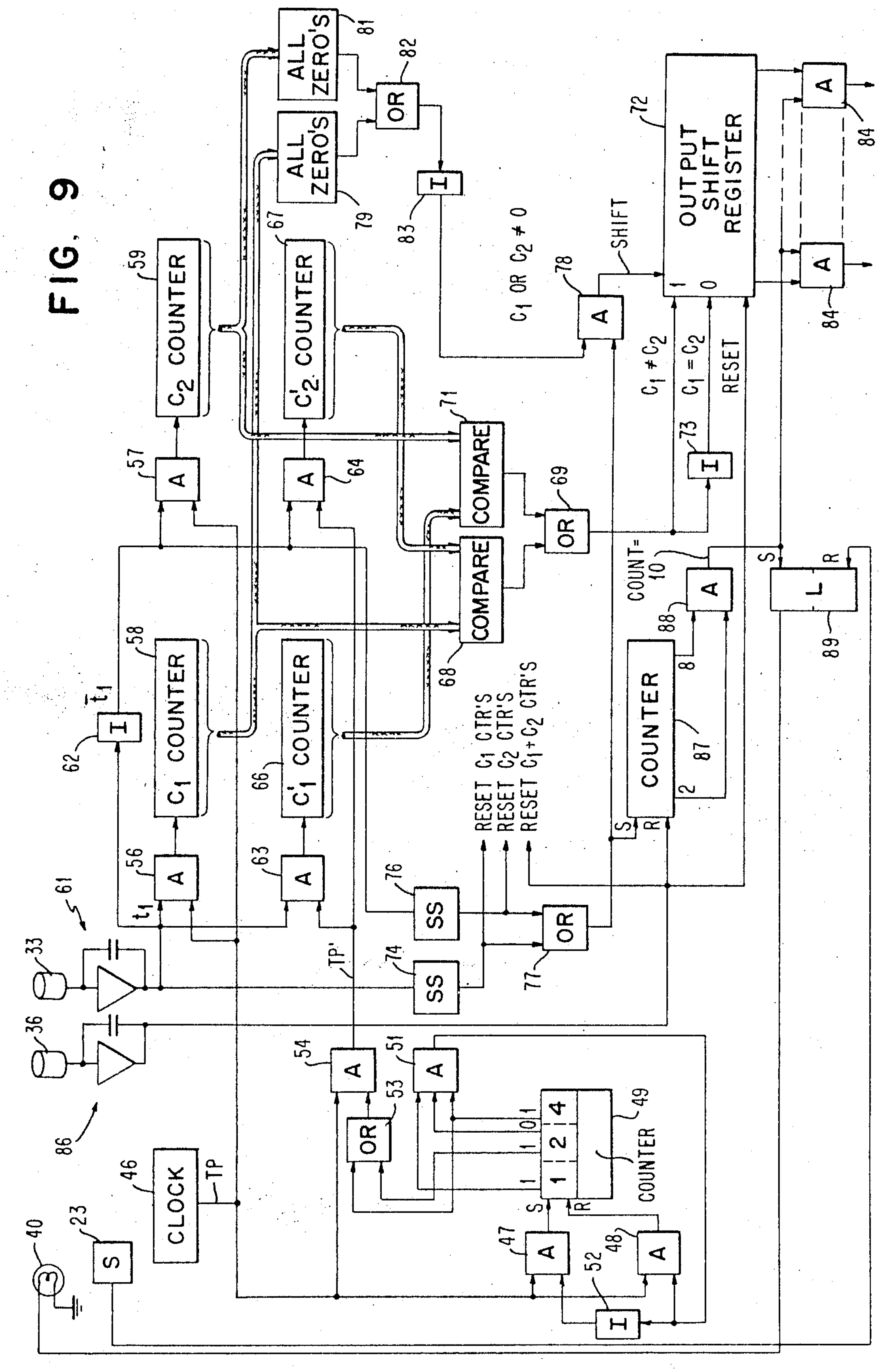
FIG. 9 is a schematic electrical diagram of the circuits utilized in the invention illustrated in FIGS. 1 and 2.

The elements described previously are included in the schematic diagram of FIG. 9 and bear the same reference numerals used in the prior figures. In FIG. 9, a clock 46 supplies clock pulses $t_p$. These pulses are applied to one input of a pair of AND gates 47 and 48. The AND gate 47 has its output connected to the set or step input of a counter 49. Counter 49 has three stages 1, 2 and 4. The one output of the stages 1 and 4 and the zero output of stage 2 are connected to an AND gate 51. The output of AND gate 51 is connected to the other input of AND gate 48 and via an inverter 52 to the other input of AND gate 47. With this circuit arrangement, AND gate 47 is enabled during all conditions of counter 49 except at the count of 5. At the count of 5, AND gate 48 is enabled via the output developed at AND gate 51 and the $t_p$ clock pulse occurring at that time and appearing at the other input of AND gate 48 resets the counter 49 to the all zero condition and as soon as this occurs, the output of AND circuit 51 drops and via inverter 52, AND gate 47 is again enabled. Thus, the counter 49 under control of the $t_p$ pulses counts from 0–5 on a repetitive cycle. The one outputs of stages 2 and 4 of counter 49 are connected via an OR circuit 53 to one input of an AND circuit 54 and thus enables the AND circuit 54 whenever stages 2 or 4 of counter 49 are in the one state. This event occurs during count values 2, 3, 4 and 5. Thus, for every six $t_p$ pulses from clock 46, four will be passed via the output of AND circuit 54 and these are termed $t_p$ . The number of $t_p$ pulses with this circuit arrangement is approximately 0.667 times the number of $t_p$ pulses from the clock 46.

The $t_p$ pulses, clock 46, are applied to one of the inputs of AND circuits 56 and 57. Whenever AND circuits 56 and 57 are enabled, the $t_p$ clock pulses are passed via the AND circuits to counters 58 and 59, respectively. Counter 58 accumulates the total number of clock pulses $t_p$ during the $C_1$ periods, that is the periods during which scanning of the dark or nonreflective areas of the codes takes place while counter 59 accumulates clock pulses $t_p$ during the time scanning of the $C_2$ or light reflective areas takes place. The control of gates 56 and 57 is derived from the output of photoreceiver 33. This output is applied via a feedback amplifier 61 to the enable input of AND gate 56 and via this same route and an inverter 62 to the enable input of AND gate 57. The output $t_1$ of amplifier circuit 61 is such as to enable the AND circuit 56 when a $C_1$ area of the indicia is being scanned. At all other times, the output of inverter 62 enables AND circuit 57. The output of amplifier 61 is in addition applied to an AND circuit 63 while the output of inverter 62 is applied to an AND circuit 64. AND circuits 63 and 64 are enabled by the outputs at the appropriate time. Thus, AND circuit 63 is enabled when the $C_1$ area is being scanned while AND circuit 64 is enabled at all other times which coincides with the scanning of a light reflective area $C_2$. The other inputs of AND circuits 63 and 64 are connected to the output of AND circuit 54 and when the AND circuits 63 and 64 are properly enabled as described above, $t_p$ pulses from the output of AND circuit 54 are passed via gates 63 and 64 to counters 66 and 67, respectively. Counters 66 and 67 correspond in function to counters 58 and 59; however, in each instance the count value will be approximately 0.667 of the value of the corresponding counter and are thus designated $C'_1$ and $C'_2$, respectively.

The output of counter 58 is applied to one set of inputs of a comparison circuit 68 while the outputs from counter 67 are connected to another set of inputs of comparison circuit 68. Comparison circuit 68 continuously compares the accumulated count in counter 58 with the count in counter 67 and provides an output whenever the accumulated value of counter 58 is less than the accumulated value of counter 67. Compare circuit 68 may be constructed as shown in Texas Instruments' "TTL Integrated Circuits Catalog Supplement," No. CC301, Mar. 15, 1970, at S11-3. The output of compare circuit 68 is applied to one input of an OR circuit 69. The outputs from counter 59 are applied to one set of inputs of the compare circuit 71 and the outputs from counter 66 are applied to the other set of inputs of compare circuit 71. Compare circuit 71 is identical in all respects to compare circuit 68 and provides a suitable output when the value accumulated in counter 59 is less than the accumulated value of counter 66. The output of compare circuit 71 is connected to OR circuit 69. The output of OR circuit 69 is connected to the "one" input of an output shift register 72 and is also inverted in an inverter circuit 73 and applied to the "-zero" input of shift register 72. The outputs of compare circuit 68 and 71 will generally be complementary and will be available at the "one" and "zero" inputs of the output shift register 72 at all times. However, the inputs indicated by $C_1$ not equalling $C_2$ or $C_1$ equalling $C_2$ will only be inserted into the shift register 72 under control of a shift pulse, the generation of which will now be described.

The output $t_1$ from amplifier 61 is applied to a single shot circuit 74 and the output $\bar{t}_1$ from inverter circuit 62 is applied to a single shot circuit 76. Single shot circuits 74 and 76 provide short duration pulses which occupy a very small portion of the $t_1$ and $\bar{t}_1$ periods. The output from single shot circuit 74 is applied to the reset input of the counters 58 and 66 while the output of single shot circuit 76 is applied to the reset input of counters 59 and 67. In addition, the outputs of single shot circuits 74 and 76 are applied via an OR circuit 77 to one input of an AND gate 78. The output of AND gate 78 is applied to the shift input of output shift register 72 whenever the AND gate 78 is properly conditioned. AND gate 78 is conditioned when neither counter 58 or counter 59, the $C_1$ and $C_2$ counters, respectively are all zeros. This input to AND gate 78 is generated by a pair of all zero detector circuits 79 and 81 connected to the output of counters 58 and 59, respectively. The output of all zero detecting circuits 79 and 81 are connected via an OR gate 82 and an inverter 83 to the input of AND gate 78 and enable the AND gate during those times when neither counter 58 or 59 is zero. The all zero detecting circuits 79 and 81 may simply be AND gates or OR gates connected to the outputs of the counters 58 and 59. If the "zero" outputs of the counter stages are utilized, the AND function must be performed. On the other hand, if the "one" outputs are utilized, an OR function will suffice. The output from inverter 83 inhibits shifting whenever either counter 58 or 59 is all zero. This prevents shifting useless information from the OR circuit 69 into the output shift register 72. The output of OR circuit 77 provides the precise moment when the shift should occur. In this connection, the output from OR circuit 77 must result in a shift before counters (58, 66) or (59, 67) are reset by the outputs of single shot circuits 74 and 76, respectively.

As previously described, the scanning head provides three parallel scans in one direction which are displaced from each other. These three scans are followed by three similar parallel scans which are oriented approximately at 90° to the first three scans. This technique is employed since the orientation of the scanning head with respect to the indicia on the container is unknown. Thus, several scans, incomplete in nature, may be made before a complete scan is done. In fact, the first five scans may be incomplete. That is, an incomplete scan being a scan in which one or more of the bars or spaces comprising the indicia are not scanned by the aperture. In this instance, the data shifted into the output register 72 is incomplete and therefore invalid. Each of the output stages of the output shift register 72 is connected to an AND circuit 84. In the embodiment disclosed, the output shift register includes eight stages and therefore eight AND gates 84 are provided. The data in the output shift register 72 is available at the AND gates 84; however, it will not be sent on to the central processor where the data is utilized unless a complete scan has been detected. The circuitry for detecting a complete scan will be described now.

The output from photoreceiver 36 which is an electrical analog of the intelligence conveyed by the reflective areas 34 is applied to an an amplifier 86 similar to amplifier 61. The output of amplifier 86 is applied to the reset input of a counter 87 which has its set or step input connected to the output of OR circuit 77. Thus, counter 87 is reset just prior to the beginning of each of the scans by the apertures 41, 42 and 43. Thereafter the counter is stepped with the output from single shot circuits 74 and 76 and if a complete scan occurs, that is if the scanning aperture scans all of the bars constituting the indicia, the counter will attain a value of 10 prior to the occurrence of another reset from the output of amplifier 86. This condition is detected by an AND circuit 88 connected to the "two" and "eight" output stages of counter 87. The output of AND circuit 88 which occurs when counter 87 attains a count of 10 is applied to the enable inputs of AND gates 84 and causes the data contained at that time in the stages of output shift register 72 to be transmitted to a data processing device since at that time, a complete scan is verified. In addition, the output of AND circuit 88 is applied to the set input of latch 89. The output of latch 89 is connected directly to lamp 40 in the scanning head and when set causes the lamp to illuminate signalling the operator that a successful scan has been completed. When the operator detects the completion of a successful scan, he releases the trigger actuator 22 causing switch 23 to assume a different state in which latch 89 is reset thus extinguishing lamp 40 and conditioning the scan head for another scanning operation.

FIG. 8 is a chart indicating the contents of the counters (58, 66) and (59, 67) during the course of a successful scan of the code illustrated diagramatically at the top of the figure. The areas $C_1$ and $C_2$ are sequentially identified on the illustration and the same notation is used below in the table. The delay indicated in the table is the delay previously described with respect to the shift function of output shift register 72 and the resetting of the counters (58, 66) and (59, 67) which contain values $C_1$ and $C_2$, respectively. After the delay, the counters are reset and in the ensuing period accumulates the counts corresponding to the areas indicated. During the periods $t_{1\text{-}1}$ and $\bar{t}_{1\text{-}1}$, shifting is inhibited into the output shift register 72 since the contents of the counters 58 and 59 are zero. During the remainder of the time, the contents have some attained value and shifting continues uninterrupted during the subsequent cycles of the scan. At the conclusion of the scan, ten $t_1$ and $\bar{t}_1$ pulses have caused counter 81 to attain a count of 10 and this value indicates the scan is complete and the contents of the output shift register may be read.

The output of amplifier 86 provides a suitable pulse for resetting counters 58, 59, 66 and 67 immediately prior to the beginning of a scan. In addition, this output resets the counter 87 and output shift register 72. At this point, the counters and shift registers are properly conditioned for processing the scan. This is indicated on the first line of the table in FIG. 8. At the occurrence of the $t_{1\text{-}1}$, the output from amplifier 61, the output of single shot circuit 74 attempts to reset the previously reset counters 58 and 66 and via OR circuit 77 attempts to enable a shifting operation in output shift register 72; however, AND gate 78 is not enabled due to the zero condition existing in counters 58 and 59. A zero condition in either one of these counters will inhibit shifting. This is indicated by the bar over the shift indication in the output register column of the table. Shortly after the occurrence of $t_{1\text{-}1}$ pulse as indicated by the delay designation on the second line, the reset of counters 58 and 66 occurs and the $C_{1\text{-}1}$ value is accumulated in counters 58 and 66 as previously described. Counters 59 and 67 are disabled at this time as a result of inverter 62 and remain at zero. When the output from amplifier 61 switches and the inverter 62 provides the appropriate $\bar{t}_{1\text{-}1}$ output for conditioning AND gates 57 and 64, a second shift is attempted. Again, the counter 59 is zero at this point and shifting is again inhibited in the same manner as previously described.

Shortly thereafter, the counters 59 and 67 are reset and the $C_{2\text{-}1}$ value is accumulated in the counters 59 and 67. Upon the occurrence of the second $t_{1\text{-}2}$ pulse, the then attained contents of the $C_1$ and $C_2$ counters are compared as previously described and result in the shifting of a zero into the output shift register 72. This is indicated again under the output shift register column. Shortly thereafter, as provided by the circuit delays, the counters 58 and 66 are reset and during the remainder of the second $t_1$ pulse, the next value for $C_1$ designated $C_{1\text{-}2}$ is accumulated in the counters 58 and 66. The counters 59 and 67 remain unchanged. Upon the occurrence of the second $\bar{t}_1$ pulse, the content of the counters is again compared in the compare circuit (68, 71) as previously described and a "one" is shifted into the output register 72. The process described above and detailed in the table in FIG. 8 continues until 10 $t_1$ and $\bar{t}_1$ pulses have been counted in counter 87. At this time, a complete scan is indicated by the output of AND gate 88 which samples the "two" and "eight" stages of the counter 87. The output of AND gate 88 enables AND gates 84 causing the contents of the output shift register 72 to be sent to the data processing unit servicing the input station. In addition, the output of AND gate 88 signals a complete scan via latch 89 and lamp 40. It should be pointed out at this time that many completed scans are apt to occur during a reading operation. This in no way affects the operation of the device and the data processing system receiving the information will be capable of handling multiple successful reads of the same data. When the operator recognizes that correct data has been sent, the scanning operation is terminated by releasing the switch 23 via its actuator and thus terminating the scanning operation. Another scanning operation, if necessary, is reinstituted by the operator as described above.

While the invention has been particularly shown and described with reference to a preferred embodiment thereof, it will be understood by those skilled in the art that various changes may be made therein without departing from the spirit and scope of the invention.

What is claimed is:

1. A scanning head adapted to be placed in fixed relation to a merchandise package or the like for reading a selectively reflective coded indicia placed on the package and comprising:

a light source for illuminating the indicia;

first light conductive means in proximity to said indicia for transmitting the reflected light from the indicia to a first termination in the same orientation as received from the indicia;

second light conductive means for transmitting light from the said first termination of the first light conductive means to a second termination and for causing the orientation of the transmitted light to undergo a predetermined rotational displacement;

cyclically operable means for aperture scanning the image of the indicia presented at the first termination successively along a plurality of displaced parallel lines and thereafter aperture scanning the rotated image of the indicia presented at the second termination successively along a plurality of displaced parallel lines which are rotated with respect to the image orientation;

means operatively associated with said cyclically operable means for indicating the beginning of each of the said aperture scans; and transducer means responsive to the aperture scanned image for providing electrical signals corresponding to the intensity of the transmitted light.

2. A scanning head as set forth in claim 1 in which the first and second light conductive means comprises a bundle of light conductive fibers, said first conductive fiber bundle having its fibers arranged in straight parallel orientation whereby an image at both ends has the same orientation and said second bundle of light conductive fibers are twisted through approximately 90° causing approximately a 90° rotation of the images at both ends of the bundle with respect to each other.

3. A scanning head as set forth in claim 2 in which the cyclically operable aperture scanning means includes:

a cylindrical member axially supported for rotation and enclosing the said second light conductive means within the wall of the cylinder so that the light transmission path is generally normal to the axis of the cylinder;

a first translucent area in the cylinder wall extending in the circumferential direction approximately 180° and in the axial direction at least to the extent of the first and second light conductive means;

a plurality of translucent apertures each substantially smaller in area than the area of the light conductive means, said apertures being disposed about the cylindrical wall of the scanning means in the portion confronting the first translucent area and being axially displaced from each other; and means for rotating said cylindrical member about its axis.

4. A scanning head as set forth in claim 3 in which the means for indicating the beginning of each of said aperture scans includes:

a plurality of reflective marks on the outer periphery of the cylindrical member for reflecting light from the said light source for illuminating the indicia; and a photoreceiver positioned to detect the light reflected by a mark immediately preceding each aperture scan of the image.

5. A scanning system for reading a selectively reflective coding indicia placed on merchandise packages and the like comprising:

a scanning head adapted to be placed in fixed relationship with a coded indicia which is to be read and including;

a light source for illuminating the indicia, first light conductive means for transmitting light reflected from the indicia to a first termination and for presenting said light at said first termination in the same orientation as received from the selectively reflective coded indicia, second light conductive means for transmitting light from the first termination of the first light conductive means to a second termination and for causing the orientation of the transmitted light to undergo a predetermined rotational displacement, cyclically operable means for aperture scanning the image of the indicia presented at the first termination successively at different positions on the termination with the same orientation and thereafter aperture scanning the image of the indicia presented at the second termination successively at different positions on the second termination with an orientation rotationally displaced with respect to the image presented at the first termination, and transducer means responsive to the aperture scanned image for providing electrical signals corresponding to the intensity of the transmitted light;

means responsive to the output from the transducer means for storing the information supplied; and means responsive to the cyclically operating scanner for counting events occurring in the signals generated by the transducer for indicating a complete scan whenever the counted events equal a predetermined number and for signalling same.

6. A scanning system as set forth in claim 5 in which the first and second light conductive means comprises a bundle of light conductive fibers, said first conductive fiber bundle having its fibers arranged in straight parallel orientation whereby an image at both ends has the same orientation and said second bundle of light conductive fibers are twisted through approximately 90° causing approximately a 90° rotation of the images at both ends of the bundle with respect to each other.

7. A scanning system as set forth in claim 6 in which the cyclically operable aperture scanning means includes:

a cylindrical member axially supported for rotation and enclosing the said second light conductive means within the wall of the cylinder so that the light transmission path is generally normal to the axis of the cylinder;

a first translucent area in the cylinder wall extending in the circumferential direction approximately 180° and in the axial direction at least to the extent of the first and second light conductive means;

a plurality of translucent apertures each substantially smaller in area than the area of the light conductive means, said apertures being disposed about the cylindrical wall of the scanning means in the portion confronting the first translucent area and being axially displaced from each other; and means for rotating said cylindrical member about its axis.

8. A scanning system as set forth in claim 7 in which the means responsive to the cyclically operating scanner for counting events in the signals generated by the transducer for indicating a complete scan includes:

first circuit means responsive to the transducer output for providing a pulse output each time the electrical signals corresponding to the intensity of the transmitted light change state;

a plurality of reflective marks on the outer periphery of the cylindrical member for reflecting light from the said light source for illuminating the indicia;

a photoreceiver positioned to detect the light reflected by the marks;

counter means having a step input, a reset input and outputs indicating a predetermined count value;

first means connecting the pulse output of the said circuit means to the step input of the counter means whereby said counter increments each time a pulse is provided;

second means connecting the output of the said photoreceiver to the reset input of the counter means whereby the counter means is reset to a predetermined reset value each time light reflected by a mark is detected; and second circuit means responsive to the counter means outputs for detecting and signalling attainment of the said predetermined count value.

9. A scanning system as set forth in claim 8 in which the means responsive to the output from the transducer means for storing the supplied information includes:

clock means providing a first output having a first clock rate and a second output having a substantially lower clock rate;

first and second counter means under control of the transducer means output signals for counting the clock pulses from the first and second clock outputs, respectively, when the signals from the transducer corresponds to one intensity;

third and fourth counter means under control of the transducer means output for counting the clock pulses from the first and second clock outputs, respectively, when the signal from the transducer corresponds to the other intensity;

comparison circuit means for comparing the first and fourth counter means and the second and third counter means to detect a predetermined inequality in the compared counts and provide an output indicative of that condition;

shift register means under control of the first circuit means responsive to the transducer output for registering the indicated output of the comparison circuit means each time the said controlling first circuit means provides a pulse output; and gate circuit means connected to the shift register output and responsive to second circuit means responsive to the counter means output for gating the contents of the shift register when the controlling second circuit means signals attainment of the said predetermined count value.

10. A scanning system as set forth in claim 9 in which the clock rate of the second clock output is between 0.66 and 0.70 times that of the first clock output.

* * * * *